United States Patent
Wang et al.

[11] Patent Number: 6,167,243
[45] Date of Patent: Dec. 26, 2000

[54] DIVERSITY COMBINING IN A COMMUNICATIONS SYSTEM

[75] Inventors: Rui Wang, Ottawa, Canada; Gang Li, Bridgewater, N.J.; Alexander V. Garmonov, Voronezh, Russian Federation; Yuri V. Yassirev, Voronezh, Russian Federation; Daniil F. Vishin, Voronezh, Russian Federation

[73] Assignee: Nortel Networks Limited, Montreal, Canada

[21] Appl. No.: 09/108,381

[22] Filed: Jul. 1, 1998

[51] Int. Cl.[7] .................................................. H04B 17/02
[52] U.S. Cl. ........................... 455/137; 455/273; 375/267
[58] Field of Search ................................... 455/132–138, 455/272, 273, 178.1, 277.1, 277.2; 375/347, 267

[56] References Cited

U.S. PATENT DOCUMENTS

| | | | |
|---|---|---|---|
| 4,752,969 | 6/1988 | Rilling | 455/278.1 |
| 5,349,609 | 9/1994 | Tsujimoto | 375/347 |
| 5,465,271 | 11/1995 | Hladik et al. | 455/137 X |
| 5,487,091 | 1/1996 | Jasper | 375/347 |
| 5,488,638 | 1/1996 | Kazecki et al. | 375/347 |
| 5,579,343 | 11/1996 | Ohmura | 455/137 X |
| 5,621,769 | 4/1997 | Wan et al. | 375/347 |
| 5,838,742 | 11/1998 | Abu-Dayya | 375/347 |
| 5,887,038 | 3/1999 | Golden | 455/138 X |
| 5,930,305 | 7/1999 | Leib | 375/324 |
| 5,999,560 | 12/1999 | Ono | 455/137 X |
| 6,075,823 | 6/2000 | Sonoda | 375/267 |
| 6,097,773 | 8/2000 | Carter et al. | 375/347 |

*Primary Examiner*—William G. Trost
*Attorney, Agent, or Firm*—Foley & Lardner

[57] ABSTRACT

A diversity path signal combiner includes two orthogonalizers which produce, from two received signals, two sets each of two relatively orthogonalized signals. One orthogonalized signal of each set includes one of the two received signals multiplied by a normalization factor, and the other includes a signal derived from both of the received signals, multiplied by a normalization factor. The inputs to the two orthogonalizers are relatively interchanged. Two signal combiners adaptively combine the two sets of orthogonalized signals with respective weights, and a selector selects between the resulting combined signals to produce an output combined signal.

10 Claims, 1 Drawing Sheet

DIVERSITY COMBINING IN A COMMUNICATIONS SYSTEM

This invention relates to diversity combining of signals received at a receiving station of a communications system, for example signals received via two spaced antennas at a base station of a cellular wireless communications system.

BACKGROUND

It is known to provide at a base station of a cellular wireless communications system, such as a system carrying AMPS (Advanced Mobile Phone System) signals, two spaced antennas the received signals from which are combined with respective weights to provide a combined received signal which has reduced susceptibility to adverse conditions such as signal fading and co-channel interference. The weights must be adaptively adjusted in a rapid manner to provide a short training time for initial set-up and to track interference changes in a fast fading environment. A reliable reference signal is required to identify the desired signal and reduce the probability of the desired signal being nulled during fading or error conditions, and a fast recovery is required from any situation in which the desired signal is nulled as a result of being erroneously treated as interference.

An object of this invention is to provide an improved method of and apparatus for diversity combining received signals in a communications system.

SUMMARY OF THE INVENTION

One aspect of this invention provides a method of combining two diversity path received signals in a communications system using an adaptive combiner, comprising the steps of: producing two orthogonalized signals from the two received signals; and adaptively combining the orthogonalized signals using the adaptive combiner to produce a combined signal.

The step of producing the two orthogonalized signals from the two received signals conveniently comprises the steps of: determining two normalization factors; multiplying a first received signal by a first normalization factor to produce a first orthogonalized signal; producing from the two received signals a signal substantially orthogonal to the first received signal; and multiplying the substantially orthogonal signal by a second normalization factor to produce a second orthogonalized signal. The received signals preferably comprise complex sampled signals, and the step of producing the substantially orthogonal signal can comprise the steps of: multiplying the second received signal by a complex conjugate of the first received signal to produce a first product; dividing an average of the first product by an average power of the first received signal to produce a multiplication factor; multiplying the first received signal by the multiplication factor to produce a second product; and subtracting the second product from the second received signal to produce the substantially orthogonal signal.

The method preferably further comprises the steps of producing a further two orthogonalized signals from the two received signals by interchanging the two received signals; adaptively combining the further two orthogonalized signals to produce a further combined signal; and selecting between the combined signals.

Another aspect of the invention provides a method of combining two diversity path received signals in a communications system, comprising the steps of: producing from the two received signals first and second orthogonalized signals and third and fourth orthogonalized signals; adaptively combining the first and second orthogonalized signals with respectively first and second weights to produce a first combined signal; adaptively combining the third and fourth orthogonalized signals with respectively third and fourth weights to produce a second combined signal; and selecting the first combined signal or the second combined signal as an output combined signal in dependence upon powers of the first to fourth orthogonalized signals multiplied by the first to fourth weights respectively.

The invention also extends to an adaptive combiner for signals received via diversity paths in a communications systems, the combiner comprising: an orthogonalizer responsive to two received signals for producing therefrom two relatively orthogonalized signals; a source of a reference signal; and a signal combiner responsive to the reference signal and to the orthogonalized signals, arranged to combine the orthogonalized signals with respective weights in dependence upon comparisons of the orthogonalized signals with the reference signal to produce a combined signal.

The orthogonalizer can comprise means for multiplying a first received signal by a first normalization factor to produce a first orthogonalized signal, for processing the two received signals to produce a signal substantially orthogonal to the first received signal, and for multiplying the substantially orthogonal signal by a second normalization factor to produce a second orthogonalized signal.

Preferably the adaptive combiner further comprises another similar orthogonalizer responsive to the two received signals, interchanged, for producing a further two relatively orthogonalized signals from the two received signals by interchanging the two received signals; another signal combiner responsive to the reference signal and to the further two orthogonalized signals, arranged to combine the orthogonalized signals with respective weights in dependence upon comparisons of the orthogonalized signals with the reference signal to produce a second combined signal; and a selector for selecting between the combined signals.

A further aspect of the invention provides an adaptive combiner for combining two diversity path received signals in a communications system, comprising: two similar orthogonalizers, each responsive to the two diversity path received signals with a respective different order to produce two sets each of two relatively orthogonalized signals, one relatively orthogonalized signal of each set comprising one of the two received signals multiplied by a respective normalization factor and the other relatively orthogonalized signal of each set comprising a signal derived from both of the received signals, multiplied by a respective normalization factor; two signal combiners, each for combining a respective set of the relatively orthogonalized signals with respective weights in dependence upon a reference signal to produce a respective combined signal; and a selector for selecting the combined signal produced by one of the signal combiners as an output combined signal.

The elements of the adaptive combiner are conveniently constituted by functions of a digital signal processor.

BRIEF DESCRIPTION OF THE DRAWINGS

The invention will be further understood from the following description with reference to the accompanying drawings, in which.

DETAILED DESCRIPTION

Figure 1:
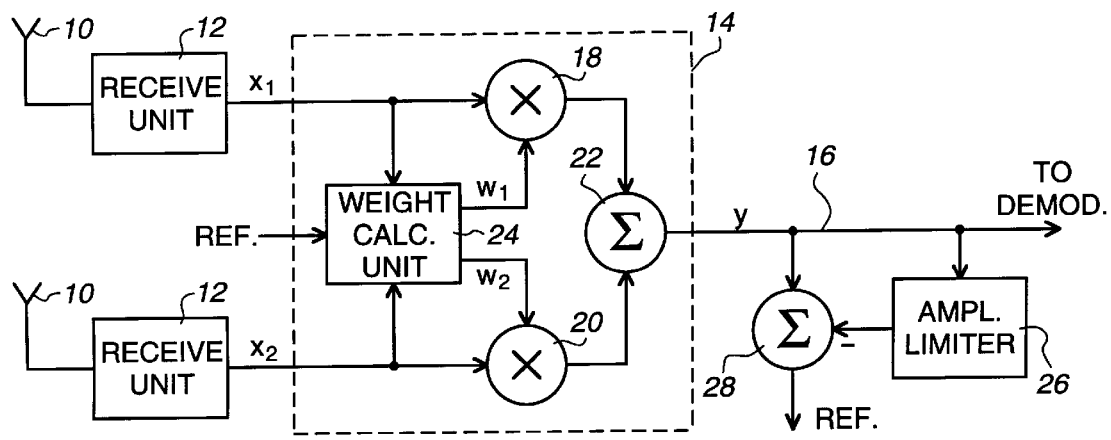
FIG. 1 schematically illustrates a receiver and diversity combining arrangement for AMPS communications.

Referring to FIG. 1, a block diagram illustrates parts of an AMPS cellular radio communications receiver having in this case two diversity paths each including a respective antenna 10 and receive unit 12 providing a respective one of two digital diversity path sampled complex signals $x_1$ and $x_2$. Each receive unit 12 for example includes, as is known in the art, an RF (radio frequency) receiver and a digital unit comprising a sampler and analog-digital converter, and a digital receive filter, and together with subsequent functions of the receiver, including the diversity combiner, can be constituted by functions of one or more digital signal processors (DSP) or application-specific integrated circuits (ASICs). The two diversity paths are provided with the two antennas physically spaced relatively far apart, e.g. by more than ten wavelengths of the RF signal, in contrast to an antenna array system in which the antenna units are spaced by half a wavelength. More than two diversity paths can be provided, and their signals can be combined, in a similar manner, but for clarity and simplicity it is assumed here that there are only two diversity paths as shown in FIG. 1.

The signals $x_1$ and $x_2$ are weighted and combined in a diversity combiner 14, shown within a dashed line box, to produce on a line 16 an optimum adaptively combined receive signal y which is supplied to an FM demodulator (not shown). The combiner 14 comprises complex signal multipliers 18 and 20, a summing unit 22, and a weight calculation unit 24. The unit 24 is supplied with the signals $x_1$ and $x_2$ and with a reference signal, and serves to produce adaptive weights $w_1$ and $w_2$. The multipliers 18 and 20 multiply the signals $x_1$ and $x_2$ by the weights $w_1$ and $w_2$ respectively, and the products are added by the summing unit 22 to produce the signal y.

As the desired signal in an AMPS receiver is a frequency modulated signal having a constant envelope and has a power which is generally greater than the power of any interference, the reference signal is conveniently produced as illustrated by amplitude limiting the signal y in an amplitude limiter 26, and subtracting the amplitude limited signal from the signal y in a summing unit 28. The reference signal can, however, be produced in any desired manner, for example from a training pattern in the desired signal or from a known part of the signal in a TDMA communications system.

The weight calculation unit 24 adaptively adjusts the weights $w_1$ and $w_2$ in an attempt to achieve optimum signal combining in which the SINT (signal to interference plus noise ratio) of the signal y is maximized, and CCI (co-channel interference) in this signal is minimized. To this end, the weight calculation unit 24 can use any of a variety of algorithms, such as a gradient search, direct matrix inversion, or recursive least square algorithm. Typically, the weight calculation unit uses a least mean square (LMS) algorithm, which is a simple type of gradient search algorithm. However, the convergence speed of this adaptive adjustment of the weights, especially in the case of the LMS algorithm, tends to be undesirably slow.

In order to reduce or overcome this disadvantage, in accordance with an embodiment of this invention an orthogonalizer is provided in the path of the signals $x_1$ and $x_2$ from the receivers 12 to the combiner 14. The orthogonalizer serves to reduce the signal power difference between the desired signal component and any interference by automatically altering the gain for the two paths as a combined function of the signal and interference powers.

Figure 2:
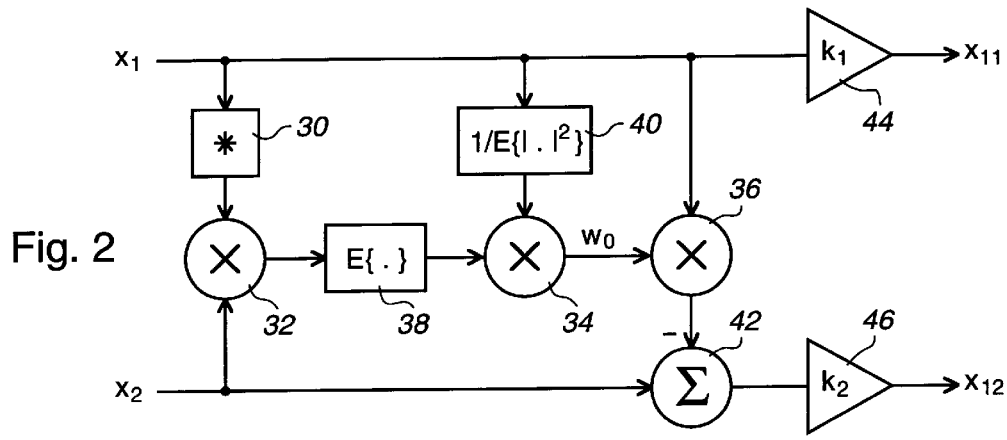
FIG. 2 schematically illustrates one form of an orthogonalizer of a diversity combining arrangement in accordance with an embodiment of this invention.

FIG. 2 illustrates one form of such an orthogonalizer, which has two inputs for the signals $x_1$ and $x_2$ from the receivers 12 and two outputs providing orthogonalized signals $x_{11}$ and $x_{12}$, which are supplied to the two inputs of the combiner 14 in place of the signals $x_1$ and $x_2$ respectively.

The orthogonalizer of FIG. 2 operates according to the known Gram-Schmidt procedure, in accordance with which the outputs $x_{11}$ and $x_{12}$ are expressed as:

$$x_{11} = k_1 x_1 \tag{1}$$

$$x_{12} = k_2(x_2 - w_0 x_1) \tag{2}$$

where, with $E\{\ \}$ denoting an averaging operation and * denoting complex conjugation, the multiplier $w_0$ and the gain or normalization factors $k_1$ and $k_2$ are given by:

$$w_0 = \frac{E\{x_1^* x_2\}}{E\{|x_1|^2\}} \tag{3}$$

$$k_1 = \frac{1}{\sqrt{E\{|x_1|^2\}}} \tag{4}$$

$$k_2 = \frac{1}{\sqrt{E\{|x_2 - w_0 x_1|^2\}}} \tag{5}$$

Conveniently, for AMPS as described here, the averaging operation is a continuous weighted averaging, for example using exponential weighting, over samples in a sliding window. For a TDMA system, conveniently a Gaussian weighting window can be applied over a TDMA time slot. Other averaging processes can alternatively be used. The result of the orthogonalization procedure is that the powers of the two output signals $x_{11}$ and $x_{12}$ are substantially the same, and the cross correlation between the two output signals is close to zero and on average is substantially zero.

Referring to FIG. 2, the orthogonalizer comprises a complex conjugation unit 30, multipliers 32, 34, and 36, averaging units 38 and 40, a summing unit 42, and gain units 44 and 46. The input signal $x_1$ is supplied to the gain unit 44, which has the gain $k_1$ to provide the output signal $x_{11}$ in accordance with equation (1) above. The signal $x_1$ is also supplied via the conjugation unit 30 to the multiplier 32, which is also supplied with the signal $x_2$ to produce at its output a product which is averaged by the averaging unit 38 in accordance with the numerator of equation (3) above. The multiplier 34 is supplied with the resulting average, and with an output of the averaging unit 40 to which the input signal $x_1$ is also supplied, to produce the multiplier $w_0$ in accordance with equation (3). The input signal $x_1$ is multiplied by $w_0$ in the multiplier 36, the product is subtracted from the input signal $x_2$ in the summing unit 42, and the result is multiplied by the gain factor $k_2$ in the gain unit 46 to produce the output signal $x_{12}$ in accordance with equation (2) above. The gain factors $k_1$ and $k_2$ of the gain units 44 and 46 respectively are determined in accordance with equations (4) and (5) above.

When the interference is effectively suppressed by the diversity combiner 14, i.e. after convergence, the ratio of the combiner weights can provide a measure of the SINR; for example, the SINR of the input signal $x_1$ can be determined as $|w_1|/|w_2|$. This can be useful in determining and avoiding false capture (interference capture), which typically can occur during fading of the desired signal to a power level which is temporarily below that of the interference. Because each diversity path is affected differently by fading at any instant, a diversity combining arrangement as illustrated in FIG. 3 can be provided to reduce the risk of false capture.

Figure 3:
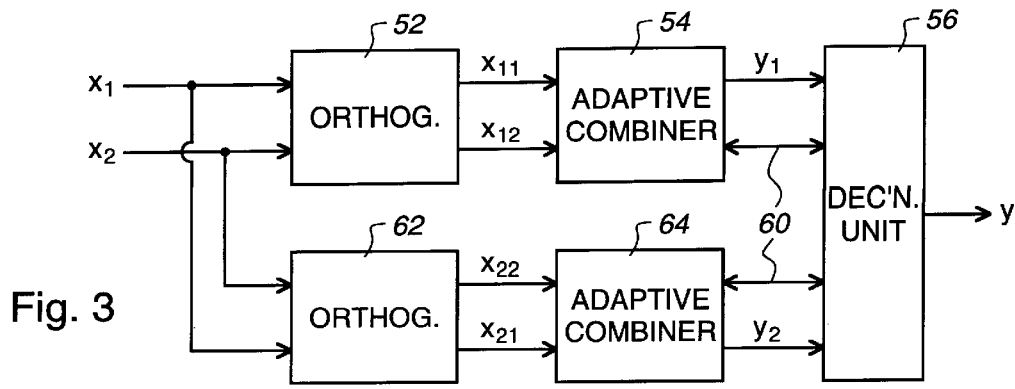
FIG. 3 schematically illustrates a diversity combining arrangement in accordance with an embodiment of this invention.

The arrangement of FIG. 3 comprises two orthogonalizers 52 and 62, two adaptive combiners 54 and 64, and a decision unit 56. The orthogonalizers 52 and 62 can be identical to one another, and the adaptive combiners 54 and 64 can be identical to one another, so that they are conveniently constituted by duplicating the functions of a DSP which implements their functions.

The orthogonalizer 52 is as described above with reference to FIG. 2, and is supplied with the input signals $x_1$ and $x_2$ from the receive units 12 to produce the orthogonalized signals $x_{11}$ and $x_{12}$. These signals are supplied to the adaptive combiner 54, which has the same form as the adaptive combiner 14 as described above, to produce a combined output signal which in FIG. 3 is referenced $y_1$. The units 52 and 54 thus are arranged and operate in the same manner as the corresponding units described above with reference to FIGS. 1 and 2. The orthogonalizer 62 is the same as the orthogonalizer 52, but as illustrated in FIG. 3 its inputs are interchanged compared with the orthogonalizer 52, so that it produces at its outputs different orthogonal signals $x_{22}$ and $x_{21}$. These are supplied to the adaptive combiner 64, which has the same form as the adaptive combiners 14 and 54, to produce another combined output signal $y_2$. The decision unit selects, on a sample by sample basis and as further described below, an optimum one of the combined signals $y_1$ and $y_2$ as a final adaptively combined output signal y. Connections 60 between the decision unit 56 and the adaptive combiners 54 and 64 provide for communication of the signals and weights necessary for the decisions described below.

Thus in the arrangement of FIG. 3, the diversity combined signals $y_1$ and $y_2$ are differently affected by fading; when the desired signal fades for one of the combined signals $y_1$ and $y_2$, it may still be dominant for the other of these combined signals, so that selection of the latter as the output signal y provides an optimum result which reduces the risk of false capture.

For an AMPS desired signal, the decision unit 56 checks each of the combined signals $y_1$ and $y_2$ for false capture. This check is based upon the recognition that the weights used in the adaptive combiner are increased under false capture conditions. Denoting the weights applied in the adaptive combiner 54 applied to the signals $x_{11}$ and $x_{12}$ as $w_{11}$ and $w_{12}$ respectively (corresponding to the weights $w_1$ and $w_2$ respectively in the combiner 14 of FIG. 1), false capture is determined for the combined signal $y_1$ when $$\begin{cases} E\{|x_{11}w_{11}|^2\} > \alpha \\ E\{|x_{12}w_{12}|^2\} > \alpha \end{cases} \quad (6)$$

where $\alpha$ is a constant threshold determined by simulation or empirically; for example $\alpha=1.3$. The averaging $E\{\ \}$ represented in equation (6) corresponds to a first order low pass filtering. In the event that false capture is determined by the decision unit 10, recapture can be achieved by restarting the adaptation process with smaller weights one of which conveniently has its sign changed. For example, the weight $w_{11}$ can be changed to one quarter of its value in the false capture state, and the weight $w_{12}$ can be changed to minus one quarter of its value in the false capture state. A corresponding check is performed for determining false capture for the combined signal $y_2$ produced by the adaptive combiner 64, in which the weights applied to the signals $x_{22}$ and $x_{21}$ are denoted $w_{22}$ and $w_{21}$ respectively.

In the event that false capture is determined for only one of the combined signals $y_1$ and $y_2$, the decision unit 56 selects the other of these signals as the output signal y. In the event that no false capture is detected, then if $$E\{|x_{11}w_{11}|^2\}+E\{|x_{12}w_{12}|^2\} > E\{|x_{22}w_{22}|^2\}+E\{|x_{21}w_{21}|^2\} \quad (7)$$

the decision unit 56 selects the signal $y_2$ as the signal y, and otherwise the decision unit 56 selects the signal $y_1$ as the signal y. As indicated above, this selection is performed for each sample. For each change, for a sample n compared with the previous sample n−1, in the selection between the signals $y_1$ and $y_2$, the decision unit 56 introduces in the path chosen for the sample n a phase shift equal to the phase difference of the two paths at the sample n−1, in order to maintain phase continuity for the output signal y.

For a TDMA desired signal, the decision unit 56 operates differently because the signal is processed on a slot-by slot basis. In this case, the decision unit 56 determines weight ratios $r_1$ and $r_2$ to estimate the reciprocals of the SINRs for the diversity paths, thus $r_1=|w_{12}|/|w_{11}|$ and $r_2=|w_{21}|/|w_{22}|$, selects the signal $y_2$ if $r_1>r_2$, and otherwise selects the signal $y_1$ as the output signal y. Thus the adaptively combined signal providing the higher SINR is supplied to the output of the diversity combining arrangement.

Although particular embodiments of the invention have been described above in detail, it can be appreciated that numerous modifications, variations, and adaptations may be made within the scope of the invention as defined in the claims.

What is claimed is:

1. A method of combining two diversity path received signals in a communications system using an adaptive combiner, comprising the steps of:

producing two orthogonalized signals from the two received signals; and adaptively combining the orthogonalized signals using the adaptive combiner to produce a combined signal;

wherein the step of producing two orthogonalized signals from the two received signals comprises the steps of:

determining two normalization factors;

multiplying a first received signal by a first normalization factor to produce a first orthogonalized signal;

producing from the two received signals a signal substantially orthogonal to the first orthogonalized signal; and multiplying the substantially orthogonal signal by a second normalization factor to produce a second orthogonalized signal.

2. A method as claimed in claim 1 wherein the received signals comprise complex sampled signals and the step of producing the substantially orthogonal signal comprises the steps of:

multiplying the second received signal by a complex conjugate of the first received signal to produce a first product;

dividing an average of the first product by an average power of the first received signal to produce a multiplication factor;

multiplying the first received signal by the multiplication factor to produce a second product; and subtracting the second product from the second received signal to produce the substantially orthogonal signal.

3. A method as claimed in claim 2 and further comprising the steps of producing a further two orthogonalized signals from the two received signals by interchanging the two received signals; adaptively combining the further two orthogonalized signals to produce a further combined signal; and selecting between the combined signals.

4. A method as claimed in claim 1 and further comprising the steps of producing a further two orthogonalized signals from the two received signals by interchanging the two received signals; adaptively combining the further two orthogonalized signals to produce a further combined signal; and selecting between the combined signals.

5. An adaptive combiner for signals received via diversity paths in a communications systems, the combiner comprising:

an orthogonalizer responsive to two received signals for producing therefrom two relatively orthogonalized signals;

a source of a reference signal; and a signal combiner responsive to the reference signal and to the orthogonalized signals, arranged to combine the orthogonalized signals with respective weights in dependence upon comparisons of the orthogonalized signals with the reference signal to produce a combined signal;

wherein the orthogonalizer comprises means for multiplying a first received signal by a first normalization factor to produce a first orthogonalized signal, for processing the two received signals to produce a signal substantially orthogonal to the first orthogonalized signal, and for multiplying the substantially orthogonal signal by a second normalization factor to produce a second orthogonalized signal.

6. An adaptive combiner as claimed in claim 5 and further comprising another similar orthogonalizer responsive to the two received signals, interchanged, for producing a further two relatively orthogonalized signals from the two received signals by interchanging the two received signals; another signal combiner responsive to the reference signal and to the further two orthogonalized signals, arranged to combine the orthogonalized signals with respective weights in dependence upon comparisons of the orthogonalized signals with the reference signal to produce a second combined signal; and a selector for selecting between the combined signals.

7. An adaptive combiner as claimed in claim 5 wherein the orthogonalizer and signal combiner are constituted by functions of a digital signal processor.

8. An adaptive combiner as claimed in claim 5 wherein the source of the reference signal comprises an amplitude limiter for limiting amplitude of the combined signal, and a unit for subtracting the amplitude limited signal from the combined signal to produce the reference signal.

9. An adaptive combiner for combining two diversity path received signals in a communications system, comprising:

two similar orthogonalizers, each responsive to the two diversity path received signals with a respective different order to produce two sets each of two relatively orthogonalized signals, one relatively orthogonalized signal of each set comprising one of the two received signals multiplied by a respective normalization factor and the other relatively orthogonalized signal of each set comprising a signal derived from both of the received signals, multiplied by a respective normalization factor;

two signal combiners, each for combining a respective set of the relatively orthogonalized signals with respective weights in dependence upon a reference signal to produce a respective combined signal; and a selector for selecting the combined signal produced by one of the signal combiners as an output combined signal.

10. An adaptive combiner as claimed in claim 9 wherein the orthogonalizers, signal combiners, and selector are constituted by functions of a digital signal processor.

* * * * *